(12) United States Patent
Jing et al.

(10) Patent No.: US 10,316,212 B2
(45) Date of Patent: Jun. 11, 2019

(54) REMOVABLE ANTIFOGGING COATINGS, ARTICLES, COATING COMPOSITIONS, AND METHODS

(71) Applicant: 3M INNOVATIVE PROPERTIES COMPANY, St. Paul, MN (US)

(72) Inventors: Naiyong Jing, Woodbury, MN (US); Xue-hua Chen, Shanghai (CN); Ruo-Ni Sun, Shanghai (CN); Zhigang Yu, Shanghai (CN); Xiaoling Xie, Shanghai (CN); Jinyu Chen, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 524 days.

(21) Appl. No.: 15/133,262

(22) Filed: Apr. 20, 2016

(65) Prior Publication Data

US 2016/0230036 A1    Aug. 11, 2016

Related U.S. Application Data

(62) Division of application No. 12/809,388, filed as application No. PCT/US2008/086760 on Dec. 15, 2008.

(30) Foreign Application Priority Data

Dec. 26, 2007   (CN) .......................... 2007 1 0305309

(51) Int. Cl.
*C09D 163/00*    (2006.01)
*B82Y 30/00*    (2011.01)
(Continued)

(52) U.S. Cl.
CPC ............ *C09D 163/00* (2013.01); *B82Y 30/00* (2013.01); *C03C 17/32* (2013.01); *C09C 1/00* (2013.01);
(Continued)

(58) Field of Classification Search
None
See application file for complete search history.

(56) References Cited

U.S. PATENT DOCUMENTS 3,337,351 A    8/1967    Morehouse
3,507,897 A    4/1970    Kanner et al.
(Continued)

FOREIGN PATENT DOCUMENTS

CN    1057066    12/1991
CN    1063706    8/1992
(Continued)

OTHER PUBLICATIONS

Bagwe et al., 2006, *Langmuir*, 22:4357-4362 "Surface Modification of Silica Nanoparticles to Reduce Aggregation and Nonspecific Binding".
(Continued)

*Primary Examiner* — Shamim Ahmed
*Assistant Examiner* — Bradford M Gates
(74) *Attorney, Agent, or Firm* — Adrian L. Pishko

(57) ABSTRACT

A coating composition which imparts antifog properties to substrates coated therewith. The coating compositions are removable and utilize nanoparticles functionalized with epoxy groups. The removable coating compositions are particularly useful on personal protection equipment such as face masks, shields, and protective glasses.

21 Claims, 2 Drawing Sheets

(51) Int. Cl.
| | | |
|---|---|---|
| C09C 1/00 | (2006.01) | |
| C09C 1/30 | (2006.01) | |
| C09C 1/40 | (2006.01) | |
| C09C 3/12 | (2006.01) | |
| C09D 1/00 | (2006.01) | |
| C09D 5/00 | (2006.01) | |
| C03C 17/32 | (2006.01) | |

(52) U.S. Cl.
CPC ............ *C09C 1/3081* (2013.01); *C09C 1/407* (2013.01); *C09C 3/12* (2013.01); *C09D 1/00* (2013.01); *C09D 5/008* (2013.01); *C01P 2004/64* (2013.01); *Y10T 428/259* (2015.01)

(56) References Cited

U.S. PATENT DOCUMENTS

| | | |
|---|---|---|
| 3,700,487 A | 10/1972 | Crandon et al. |
| 4,152,165 A | 5/1979 | Langager et al. |
| 4,338,377 A | 7/1982 | Beck et al. |
| 5,015,523 A | 5/1991 | Kawashima et al. |
| 5,126,394 A | 6/1992 | Revis et al. |
| 5,585,186 A | 12/1996 | Scholz et al. |
| 5,668,618 A | 9/1997 | Simioni |
| 5,716,921 A | 2/1998 | Neumiller |
| 5,723,175 A | 3/1998 | Scholz et al. |
| 5,753,373 A | 5/1998 | Scholz et al. |
| 5,873,931 A | 2/1999 | Scholz et al. |
| 5,929,159 A * | 7/1999 | Schutt ............... C09D 4/00 524/544 |
| 5,985,028 A | 11/1999 | Cornell |
| 5,997,621 A | 12/1999 | Scholz et al. |
| 6,040,053 A | 3/2000 | Scholz et al. |
| 6,165,256 A | 12/2000 | Hayakawa et al. |
| 6,228,499 B1 | 5/2001 | Nakauchi et al. |
| 6,467,897 B1 | 10/2002 | Wu et al. |
| 6,727,309 B1 | 4/2004 | Paiva et al. |
| 6,767,410 B2 | 7/2004 | Aubay et al. |
| 7,022,416 B2 | 4/2006 | Teranishi |
| 7,074,463 B2 | 7/2006 | Jones et al. |
| 7,094,747 B2 | 8/2006 | Geffroy et al. |
| 7,179,513 B2 | 2/2007 | Jones et al. |
| 7,264,872 B2 | 9/2007 | Walker, Jr. et al. |
| 7,297,810 B2 | 11/2007 | Walker, Jr. et al. |
| 7,309,517 B2 | 12/2007 | Jones et al. |
| 7,326,448 B2 | 2/2008 | Jones et al. |
| 7,369,122 B2 | 5/2008 | Cross et al. |
| 7,427,438 B2 | 9/2008 | Jones et al. |
| 7,622,164 B2 | 11/2009 | Jones et al. |
| 2004/0097600 A1* | 5/2004 | Greenwood ........... B82Y 30/00 516/86 |
| 2004/0237833 A1 | 12/2004 | Sepeur et al. |
| 2006/0147674 A1 | 7/2006 | Walker et al. |
| 2006/0204676 A1 | 9/2006 | Jones et al. |
| 2006/0204679 A1 | 9/2006 | Jones et al. |
| 2007/0104922 A1 | 5/2007 | Zhai et al. |
| 2007/0275042 A1 | 11/2007 | Anderson et al. |

FOREIGN PATENT DOCUMENTS

| | | |
|---|---|---|
| CN | 1340587 | 3/2002 |
| CN | 200610113975.0 | 4/2008 |
| CN | 200810102088.2 | 9/2009 |
| EP | 0 424 006 A2 | 4/1991 |
| EP | 1 489 146 | 12/2004 |
| JP | 59-15473 | 1/1984 |
| JP | 60-44147 | 10/1985 |
| JP | 60-44148 | 10/1985 |
| JP | 6044149 | 10/1985 |
| JP | 4-198278 | 7/1992 |
| JP | 2001-164241 | 6/2001 |
| JP | 2003-183618 | 7/2003 |
| JP | 2005-013882 | 1/2005 |
| JP | 2006-321978 | 11/2006 |
| JP | 2007-500209 | 1/2007 |
| JP | 2007-112861 | 5/2007 |
| WO | WO 2000/00855 A1 | 1/2000 |
| WO | WO 2003/080744 | 7/2005 |
| WO | WO 2005/067753 A1 | 7/2005 |
| WO | WO 2007/056427 | 5/2007 |

OTHER PUBLICATIONS

Bruchez, Jr. et al., 1998, *Science*, 281:2013-2016 "Semiconductor Nanocrystals as Fluorescent Biological Labels".

Douce et al., "Effect of filler size and surface condition of nano-sized silica particles in polkysiloxane coatings," 2004, Thin Solid Films, 466, pp. 114-122.

Cebeci et al., 2006, *Langmuir*, 22:2856-2862 "Nanoporosity-Driven Superhydrophilicity: A Means to Create Multifunctional Antifogging Coatings".

Huang et al., 2010, *New Chemical Materials*, 38(3):103-105 "High transparent agricultural film containing silica for anti-fogging".

Innocenzi et al., "Competitive Polymerization between Organic and Inorganic Networks in Hybrid Materials," Chem. Mater., 2000, vol. 12, pp. 3726-3732.

Kang et al., 2004, *Korea-Australia Rheology Journal*, 16(4):175-182 "Material and rheological properties of (glycidoxypropyl) trimethoxysilane modified colloidal silica coatings".

Kneuer et al., 2000, *International Journal of Pharmaceutics*, 196:257-261 "Silica nanoparticles modified with aminosilanes as carriers for plasmid DNA".

Loo et al., 2004, *Technology in Cancer Research & Treament*, 3(1):33-40 "Nanoshell-Enabled Photonics-Based Imaging and Therapy of Cancer".

Song et al., 2003, *Journal of Sol-Gel Science and Technology*, 27:53-59 "Synthesis of Hydrophilic Coating Solution for Polymer Substrate Using Glycidoxypropyltrimethoxysilane".

Wang et al., 1997, *Nature*, 388:431-432 "Light-induced amphiphilic surfaces".

Wiese, 2003, *Luminescence*, 18:25-30 "Analysis of several fluorescent detector molecules for protein microarray use".

Yuan et al., 2002, *Science*, 295:102-105 "Electrically Driven Single-Photon Source".

PCT International Search Report for PCT/US2008/086760—dated Mar. 26, 2009.

\* cited by examiner

REMOVABLE ANTIFOGGING COATINGS, ARTICLES, COATING COMPOSITIONS, AND METHODS

CROSS REFERENCE TO RELATED APPLICATIONS

This application is a divisional of U.S. application Ser. No. 12/809,388, filed Feb. 17, 2011, which is a national stage filing under 35 U.S.C. 371 of PCT/US2008/086760, filed Dec. 15, 2008, which claims priority to Chinese Application No. 200710305309.1, filed Dec. 26, 2007, the disclosure of which is incorporated by reference in its/their entirety herein.

BACKGROUND

There are numerous instances where optically clear articles would be enhanced if the tendency of the articles to be obscured by the formation of a fog on a surface of the article could be reduced. For example, protective eyewear (goggles, face shields, helmets, etc.), ophthalmic lenses, architectural glazings, decorative glass frames, motor vehicle windows and windshields may be detrimentally affected by the formation of a moisture vapor fog on a surface of the article.

In general, fog formation occurs under conditions of high humidity and high temperature or at interfacial boundaries where there is a large temperature and humidity difference. Coatings which reportedly reduce the tendency for surfaces to "fog up" (i.e., antifogging coatings) are known, including those that incorporate surfactants; however, a need still exists for a coating composition that will impart antifog properties to a substrate coated therewith, particularly one that is removable.

SUMMARY

The invention relates to a coating composition which imparts antifog properties (i.e., antifogging characteristics) to substrates coated therewith, as well as methods of coating and coated articles. The coating compositions are removable and utilize nanoparticles (preferably silica nanoparticles) functionalized with epoxy groups. The removable coating compositions are particularly useful on personal protection equipment such as face masks, shields, and protective glasses.

Significantly, a dried coating of the present invention is preferably durable, even though it is removable. That is, a preferred dried coating of the present invention provides antifog characteristics to the substrate for at least 10 hours, even though it can be removed by simply wiping, for example, with a dry or wet cloth.

In one embodiment, the present invention provides a method of providing antifogging characteristics to a substrate. The method includes applying a coating composition to the substrate and allowing it to dry (i.e., the liquid carrier to substantially completely removed, for example, by evaporating). The coating composition is prepared at a pH of no greater than 6 (i.e., is functionalized with epoxy groups at a pH of no greater than 6, but can be at a pH of 7-8 upon application). The coating composition includes: nanoparticles having a particle size of no greater than 60 nm, and including a silica surface having functional groups attached to the surface through covalent bonds; an optional surfactant; (and other optional additives if desired); and water. The functional groups include epoxy groups and optional water-dispersible groups. The coating composition provides antifogging characteristics to a substrate on which it is coated and dried, and is removable after drying.

In another embodiment, the present invention provides an antifogging coating composition that includes: nanoparticles having a particle size of no greater than 60 nm, and including a silica surface having functional groups attached to the surface through covalent bonds; an optional surfactant; (and other optional additives if desired); and water. In this embodiment, the functional groups include epoxy groups and optional water-dispersible groups, the coating composition is prepared at a pH of no greater than 6; and the coating composition provides antifogging characteristics to a substrate on which it is coated and dried, and is removable after drying.

In another embodiment, the present invention provides a personal protection article including a substrate having a surface coated with an antifogging coating, wherein the coating includes nanoparticles having a particle size of no greater than 60 nm, and including a silica surface having functional groups attached to the surface through covalent bonds, wherein the functional groups include epoxy groups and optional water-dispersible groups. The coating can also include an optional surfactant and other optional additives, if desired. The coating provides antifogging characteristics to the substrate, is removable, and is formed upon drying a coating composition prepared at a pH of no greater than 6.

In certain embodiments of the present invention, the water-dispersible groups are present and include carboxylic acid groups, sulfonic acid groups, phosphonic acid groups, salts thereof, or combinations thereof.

In certain embodiments, the nanoparticles have a particle size of no greater than 20 nm. In certain embodiments, the nanoparticles have a particle size of 4-5 nm.

In certain embodiments, the epoxy groups are present in the coating composition in an amount equivalent to at least 3 mole-% of the total molar functional groups on a particle surface. Preferably, the epoxy groups are present in an excess amount.

In certain embodiments, the coating composition is prepared at a pH of 1 to 3.

In certain embodiments, the coating composition includes at least 0.2 wt-% nanoparticles, based on the total weight of the coating composition. In certain embodiments, the coating composition includes no greater than 20 wt-% nanoparticles, based on the total weight of the coating composition.

In certain embodiments, the coating composition includes at least 0.1 wt-% surfactant, based on the total weight of the coating composition.

In certain embodiments, the coating composition further includes an antimicrobial agent.

In certain embodiments, a dried coating provides antifog characteristics to the substrate for at least 10 hours.

In certain embodiments, the coating composition is impregnated into an applicator substrate (e.g., a wipe or pad). In certain embodiments, the applicator substrate is a paper wipe.

In a preferred embodiment, the present invention provides a face shield that includes a substrate having a silicone surface and an antifogging coating on the silicone surface, wherein the antifogging coating includes: nanoparticles having a particle size of 4-5 nm, and comprising a silica surface having functional groups attached to the surface through covalent bonds; a silicone surfactant; and water. The functional groups comprise: epoxy groups; and optional water-dispersible groups. In this embodiment, the coating provides antifogging characteristics to the substrate and is removable; and the coating is formed upon drying a coating composition prepared at a pH of 1 to 3.

In another preferred embodiment, the present invention provides an antifogging applicator than includes an antifogging coating composition impregnated into an applicator substrate. The coating composition comprises nanoparticles having a particle size of 4-5 nm, and comprising a silica surface having functional groups attached to the surface through covalent bonds; a silicone surfactant; and water. The functional groups comprise epoxy groups; and optional water-dispersible groups. In this embodiment, the coating composition is prepared at a pH of 1 to 3; and the coating composition provides antifogging characteristics to a substrate on which it is coated and dried, and is removable after drying.

Definitions

"Nanoparticles" are herein defined as nanometer-sized particles, preferably with an average particle size of no greater than 60 nanometers (nm). As used herein, "particle size" and "particle diameter" have the same meaning and are used to refer to the largest dimension of a particle (or agglomerate thereof). In this context, "agglomeration" refers to a weak association between particles which may be held together by charge or polarity and can be broken down into smaller entities.

"Water-dispersible groups" are monovalent groups that are capable of providing a hydrophilic surface thereby reducing, and preferably preventing, excessive agglomeration and precipitation of the nanoparticles in water.

Herein, a "removable" dried coating is one that can be removed from a surface (preferably, completely removed without any residue remaining) by wiping the surface with a wet or dry cloth or paper towel using light hand pressure, or by rinsing with water.

A "dried" coating is a coating that has been applied from a coating composition that includes a liquid carrier (i.e., fluid media), and the liquid carrier has been substantially completely removed, for example, by evaporation.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a nanoparticle that comprises "a" functional group can be interpreted to mean that the nanoparticle includes "one or more" functional groups.

The term "and/or" means one or all of the listed elements or a combination of any two or more of the listed elements.

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
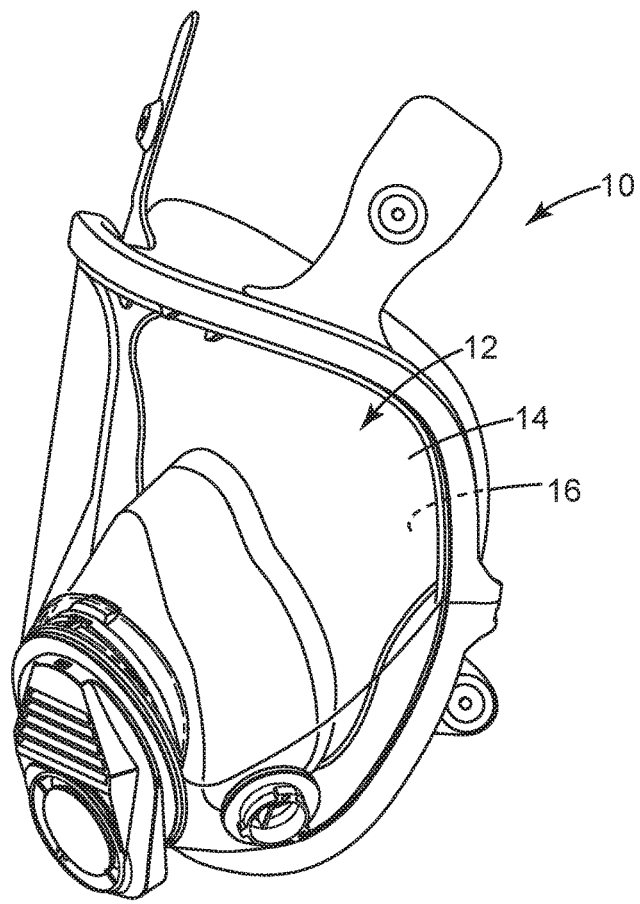
FIG. 1 illustrates a respirator comprising a face shield that includes a transparent substrate with an antifog coating of the present invention thereon.

The invention relates to coating compositions containing functionalized nanoparticles, particularly silica nanoparticles. Significantly, the coating compositions are removable. Thus, they can be used on personal protection equipment, such as face masks, shields, and protective glasses, in situations where it is not desirable or required to have permanent antifogging characteristics. The coating compositions can also be useful in automotive applications such as, for example, on headlights and windows.

The coating compositions of the present invention provide antifog properties to substrates coated and dried thereon. Dried coatings are considered antifogging if a coated substrate resists the formation of small, condensed water droplets in sufficient density to significantly reduce the transparency of the coated substrate such that it cannot be adequately seen through, after exposure to repeated human breathing directly on the article and/or after holding the article above a "steam" jet. A coating composition may still be regarded as antifogging even though a uniform water film or a small number of large water droplets forms on the coated substrate so long as the transparency of the coated substrate is not significantly reduced such that it cannot be readily seen through. In many instances, a film of water that does not significantly reduce the transparency of the substrate will remain after the substrate has been exposed to a "steam" jet.

The dried coating compositions of the present invention are removable, yet they are sufficiently durable that they can provide antifog characteristics for at least 10 hours, preferably at least 20 hours, and often as long as 60 hours under humid conditions. The dried coating compositions are typically removable (preferably, completely without any residue) from the substrates to which they have been applied (and dried). Herein, a "removable" dried coating is one that can be removed from a surface (preferably, completely removed without any residue remaining) by wiping the surface with a wet or dry cloth or paper towel using light hand pressure, or by rinsing with water. Removability allows for the used, inexpensive coating to be replaced from a relatively expensive article such as a face shield of a respirator without any damage to its surface prior to replacing it with a fresh layer of coating.

The nanoparticles used in the coating compositions of the present invention are functionalized with epoxy groups. Typically, this is accomplished by functionalizing the nanoparticles using en epoxy functional compound under acidic conditions, preferably at a pH of no greater than 6, more preferably at a pH of no more than 5, even more preferably at a pH of no more than 3, and even more preferably at a pH of 1 to 3. This functionalization at a low pH contributes to the antifogging characteristics of the composition. Once the composition is prepared under such acidic conditions, the pH can be raised to a range of 7 to 8 for application to a substrate, if desired.

Preferred compositions of the present invention can have a relatively long shelf-life, preferably up to 2 years even when stored in liquid form or impregnated in an applicator substrate in a sealed container under ambient conditions (e.g., at Room Temperature). This is surprising because most conventional nanoparticle-based compositions are not as stable (with the nanoparticles precipitating and/or agglomerating), and the shelf-life can be on the order of days and even hours under extreme conditions such as at elevated temperatures. With coating compositions of the present invention, the higher the molar equivalents of epoxy groups used in making the coating compositions the greater the stability when compared with the particles modified by low molar percentages of epoxy groups.

Nanoparticles

Nanoparticles that are surface modified in accordance with the present invention comprise nanometer-sized particles. The term "nanometer-sized" refers to particles that are characterized by an average particle size (or average particle diameter for spherical particles) in the nanometer range, preferably no greater than 60 nanometers (nm) (prior to surface modification, i.e., functionalization). More preferably, the average particle size is no greater than 45 nm (prior to surface modification), even more preferably no greater than 20 nm (prior to surface modification), even more preferably no greater than 10 nm (prior to surface modification), and even more preferably no greater than 5 nm (prior to surface modification). Preferably, prior to surface modification, the average particle size of the silica nanoparticles is at least 1 nm, more preferably at least 2 nm, even more preferably at least 3 nm, and even more preferably at least 4 nm, and even more preferably at least 5 nm. A particularly preferred particle size is 4 nm to 5 nm.

Average particle size of the nanoparticles can be measured using transmission electron microscopy. In the practice of the present invention, particle size may be determined using any suitable technique. Preferably, particle size refers to the number average particle size and is measured using an instrument that uses transmission electron microscopy or scanning electron microscopy. Another method to measure particle size is dynamic light scattering that measures weight average particle size. One example of such an instrument found to be suitable is the N4 PLUS SUB-MICRON PARTICLE ANALYZER available from Beckman Coulter Inc. of Fullerton, Calif.

It is also preferable that the nanoparticles be relatively uniform in size. Uniformly sized nanoparticles generally provide more reproducible results. Preferably, variability in the size of the nanoparticles is less than 25% of the mean particle size.

Herein, nanoparticles (prior to functionalization) are water-dispersible to reduce, and preferably prevent, excessive agglomeration and precipitation of the particles in an aqueous environment. If necessary, water-dispersibility can be enhanced by functionalizing the nanoparticles with water-dispersible groups. Nanoparticle aggregation can result in undesirable precipitation, gellation, or a dramatic increase in viscosity; however, small amounts of agglomeration can be tolerated when the nanoparticles are in an aqueous environment as long as the average size of the agglomerates (i.e., agglomerated particles) is no greater than 60 nm. Thus, the nanoparticles are preferably referred to herein as colloidal nanoparticles since they can be individual particles or small agglomerates thereof.

The nanoparticles preferably have a surface area of at least 10 $m^2$/gram, more preferably at least 20 $m^2$/gram, and even more preferably at least 25 $m^2$/gram. The nanoparticles preferably have a surface area of greater than 750 $m^2$/gram.

Nanoparticles of the present invention can be porous or nonporous. They can include essentially only silica (although other oxides can be used, such as $ZrO_2$, colloidal zirconia, $Al_2O_3$, colloidal alumina, $CeO_2$, colloidal ceria, $SnO_2$, colloidal tin (stannic) oxide, $TiO_2$, colloidal Titanium dioxide), or they can be composite nanoparticles such as core-shell nanoparticles. A core-shell nanoparticle can include a core of an oxide (e.g., iron oxide) or metal (e.g., gold or silver) of one type and a shell of silica (or zirconia, alumina, ceria, tin oxide, or titanium dioxide) deposited on the core. Silica is the most preferred nanoparticle, particularly silica nanoparticles derived from a silicate, such as an alkali metal silicate or ammonium silicate. Herein, "silica nanoparticles" refer to nanoparticles that include only silica as well as to core-shell nanoparticles with a surface that includes silica.

The unmodified nanoparticles can be provided as a sol rather than as a powder. Preferred sols generally contain from 15 wt-% to 50 wt-% of colloidal particles dispersed in a fluid medium. Representative examples of suitable fluid media for the colloidal particles include water, aqueous alcohol solutions, lower aliphatic alcohols, ethylene glycol, N,N-dimethylacetamide, formamide, or combinations thereof. The preferred fluid medium is aqueous, e.g., water and optionally one or more alcohols. When the colloidal particles are dispersed in an aqueous fluid, the particles can be stabilized due to common electrical charges that develop on the surface of each particle. The common electrical charges tend to promote dispersion rather than agglomeration or aggregation, because the similarly charged particles repel one another.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Oak Brook, Ill.). One useful silica sol is NALCO 1050 available as a silica sol with mean particle size of 20 nanometers. Another useful silica sol is NALCO 1034a available as a silica sol with mean particle size of 20 nanometers. Another useful silica sol is NALCO 2326 available as a silica sol with mean particle size of 5 nanometers. Additional examples of suitable colloidal silicas are described in U.S. Pat. No. 5,126,394.

The sols used in the present invention generally can include counter cations, in order to counter the surface charge of the colloids. Depending upon pH and the kind of colloids being used, the surface charges on the colloids can be negative or positive. Thus, either cations or anions are used as counter ions. Examples of cations suitable for use as counter ions for negatively charged colloids include $Na^+$, $K^+$, $Li^+$, a quaternary ammonium cation such as $NR_4^+$, wherein each R can be any monovalent moiety, but is preferably H or lower alkyl, such as —$CH_3$, combinations of these, and the like.

The nanoparticle concentration in coating compositions of the present invention is preferably at least 0.05 percent by weight (wt-%), more preferably at least 0.2 wt-%, and even more preferably at least 2 wt-%, based on the total weight of the coating composition. The nanoparticle concentration is preferably no greater than 20 wt-%, and more preferably no greater than 10 wt-%, based on the total weight of the coating composition. Above about 20 percent by weight the coating composition becomes difficult to apply in the desired thickness range and below about 0.05 percent by weight, excessive time periods are required for the coating to dry after application to the substrate. The terms "composition" and "solution" as used herein include dispersions or suspensions of nanoparticles in a liquid medium.

Epoxy Functional Groups

The nanoparticles of the present invention are functionalized with epoxy groups, typically using epoxysilane chemistry. The epoxy groups are covalently bonded to the silica surface of individual nanoparticles, preferably through Si—O—Si bonds. Other nanoparticles containing zirconia, alumina, ceria, tin oxide, or titanium dioxide, may similarly be attached to epoxysilanes by the chemical bonds Zr—O—Si, Al—O—Si, Ce—O—Si, Sn—O—Si, and Ti—O—Si, respectively. These chemical bonds may not be as strong as the siloxane bond, Si—O—Si, however, their bond strength can be enough for the present removable antifogging coating applications.

The level of coverage of the nanoparticles herein is reported in terms of the concentration of epoxy groups in the coating composition, assuming 100% of the amount of epoxy groups in the coating composition would be covalently bonded to surface of the silica particles. Preferably, the epoxy groups are present in the coating composition in an amount equivalent to at least 3 mole-% of the total molar functional groups on a particle surface. More preferably, the epoxy groups are present in the coating composition in an amount equivalent to at least 5 mole-%, even more preferably at least 10 mole-%, and even more preferably at least 25 mole-% of total molar functional groups on the particle surface. Higher molar equivalents of epoxy groups can contribute to enhanced shelf-life of the coating composition (i.e., enhanced stability of a dispersion without excessive precipitation and/or agglomeration).

In certain situations, an excess of epoxy groups (i.e., greater than 100%) can be desirable; however, typically the concentration of epoxy groups in the coating composition is no more than 150 mole-% of the total molar functional groups on the particle surface. Due to the multifunctionality of the epoxy silanes, when the coating composition includes more than 100 mole-% epoxy groups, more than a monolayer of the epoxysilane is created on the particle surface. An excess of hydrolyzed epoxysilane, when present, can also function as a primer on the surface of the substrate.

Typically, the nanoparticle functionalization is accomplished by functionalizing the nanoparticles with epoxy groups under acidic conditions. Typically, this is accomplished by functionalizing the nanoparticles using epoxy functional compounds under acidic conditions, preferably at a pH of no greater than 6, more preferably at a pH of no more than 5, even more preferably at a pH of no more than 3, and even more preferably at a pH of 1 to 3. Such pH is maintained for at least 3 hours, preferably at least 8, and more preferably at least 12 hours. The desired pH and time of reaction are ones that enhance functionalization, enhance stability of the composition (e.g., reduce precipitation and/or agglomeration of the particles), and enhance antifogging characteristics of the resultant coating. Typically, the longer the time of reaction, the greater the antifogging characteristics of the resultant coating. For nanoparticles of 4-5 nm, the preferred pH range for the functionalization reaction is 1 to 3. After the functionalization reaction is carried out to the desired level (preferably, completed), the pH of the coating solution may be brought to a pH range of 7 to 8.

The functional groups include various chemical groups that allow for binding to the nanoparticles. Such groups are typically provided by functional compound represented by the formula A-L-F. The functional group F includes the epoxy groups. In this representation, the group A is the nanoparticle surface-bonding group, and L can be a bond or any of a variety of organic linkers. Organic linkers L can be linear or branched alkylene, arylene, or a combination of alkylene and arylene groups, optionally including heteroatoms.

Exemplary epoxy functional compounds include:

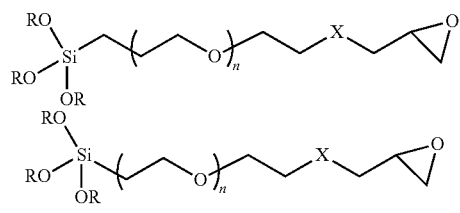

n = 0-10
X = CH2, O, S, NHCOR
R = -CH3, -C2H5, -C3H7, -C4H9

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. For epoxy functional compounds A-L-F, the surface-bonding groups A are typically silanols, alkoxysilanes, or chlorosilanes, which can be monofunctional, difunctional, or trifunctional. For example, the silanol groups on the surfaces of the silica nanoparticles are reacted with at least one silanol, alkoxysilane, or chlorosilane group of a functional compound to form a functionalized nanoparticle. Exemplary conditions for reacting functional compounds with silica nanoparticles are described in the Examples Section.

Optional Water-Dispersible Groups

If desired, to enhance water-dispersibility of the epoxy-functionalized nanoparticles of the present invention, additional water-dispersible groups can be covalently attached to individual particles. Water-dispersible groups are monovalent groups that are capable of providing hydrophilic characteristics to the nanoparticle surface, thereby reducing, and preferably preventing, excessive agglomeration and/or precipitation of the nanoparticles in an aqueous environment (although small amounts of agglomeration can be tolerated when the nanoparticles are in an aqueous environment as long as the average size of the agglomerates is preferably no greater than 60 nm). By monovalent, it is meant that the water-dispersible groups do not have reactive end groups.

As used herein, the term "water-dispersible compound" describes a compound that can react with a surface of the nanoparticles to modify it with water-dispersible groups. It can be represented by the formula A-L-WD, wherein A are the surface-bonding groups, which may be the same or different as other surface-bonding groups described herein, WD represents the water-dispersible groups, and L represents an organic linker or a bond. Organic linkers L can be linear or branched alkylene, arylene, or a combination of alkylene and arylene groups, optionally including heteroatoms.

The water-dispersible groups are hydrophilic or water-like groups. They typically include, for example, anionic groups, cationic groups, groups that are capable of forming an anionic group or cationic group when dispersed in water (e.g., salts or acids), or mixtures thereof.

The anionic or anion-forming groups can be any suitable groups that contribute to anionic ionization of the surface. For example, suitable groups include carboxylate groups ($—CO_2^-$ groups, including polycarboxylate), sulfate groups ($—SO_4^-$ groups, including polysulfate), sulfonate groups ($—SO_3^-$ groups, including polysulfonate), phosphate groups ($—PO_4^-$ groups, including polyphosphate), phosphonate ($—PO_3^-$ groups, including polyphosphonate), and similar groups, and acids thereof.

The cationic or cation-forming groups can be any suitable groups that contribute to cationic ionization of the surface. For example, suitable groups include quaternary ammonium, phosphonium, and sulfonium salts.

In certain embodiments, preferred water-dispersible groups include carboxylic acid groups, sulfonic acid groups, phosphonic acid groups, or combinations thereof.

In certain embodiments, the attachment of water-dispersible groups on the surface of nanoparticles, significantly, means that dispersions thereof do not require external emulsifiers, such as surfactants, for stability. However, if desired anionic and cationic water-dispersible compounds can also be used in a composition that includes the functionalized nanoparticles to function as an external emulsifier and assist in the dispersion of the nanoparticles.

The water-dispersible groups can be provided using water-dispersible compounds of the formula A-L-WD. Suitable surface-bonding groups A of the water-dispersible compounds are described herein for the epoxy functional compounds. Examples include silanols, alkoxysilanes, or chlorosilanes.

Some preferred water-dispersible compounds include the following:

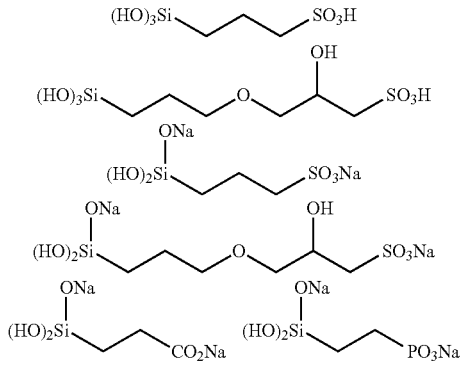

as well as other known compounds.

Those of ordinary skill in the art will recognize that a wide variety of other water-dispersible compounds are useful in the present invention as external emulsifiers or as compounds that can be used to modify the nanoparticles with water-dispersible groups.

Preferably, a sufficient amount of water-dispersible compound is reacted with the nanoparticles to provide the desired level of water-dispersibility without interfering with the antifogging characteristics of the compositions of the present invention.

The level of coverage of the nanoparticles by water-dispersible groups herein is reported in terms of the concentration of water-dispersible groups in the coating composition, assuming 100% of the amount of water-dispersible groups in the coating composition would be covalently bonded to surface of the particles. If used, the water-dispersible groups are preferably present in the coating composition in an amount equivalent to at least 1 mole-% of the total molar functional groups on a particle surface, and more preferably at least 10 mole-%. If used, the water-dispersible groups are preferably present in the coating composition in an amount equivalent to no more than 60 mole-% of the total molar functional groups on a particle surface, more preferably no more than 50 mole-%, more preferably, no more than 20 mole-%, and even more preferably no more than 10 mole-%.

Preferably, the desired level of water-dispersibility is such that an external emulsifier is not necessary for preparing a storage-stable dispersion.

Optional Additives

In certain embodiments, the compositions of the present invention include one or more surfactants. The term "surfactant" as used herein describes molecules that reduce the surface tension of the coating composition and provide a coating which imparts antifog properties to substrates or articles coated therewith. Useful surfactants of the present invention include anionic, cationic, nonionic, or amphoteric surfactants. Examples include the following:

| Surfactant Type | Surfactant Name | Product Name | Source |
|---|---|---|---|
| Anionic | Sodium dodecyl benzene sulfonate | DS-10 | Rhone-paulenc |
| Amphoteric | N-coco-aminopropionic acid | MIRATAINE AP-C | Rhone-paulenc |
| Nonionic | Lauryl dimethylamine oxide | RRODAMOX LO | Rhone-paulenc |
| Nonionic | PEG/PPG/PEG block copolymer | PLURONIC F38 | BASF |
| Nonionic | Organosilicone surfactant | BYK-333 | BYK |
| Nonionic | Organosilicone surfactant | Q2-5211 | Dow-corning |
| Nonionic | Fluorochemical surfactant | FC-4430 | 3M |
| Nonionic | Fluorochemical surfactant | FC-4432 | 3M |
| Nonionic | Polyoxyethylene (7) lauryl ether | AEO7-24S | Sasol (China) Chemical Co., Ltd. |
| Nonionic | Polyoxyethylene (9) lauryl ether | AEO7-24S | Sasol (China) Chemical Co., Ltd. |
| Nonionic | Polyoxyethylene (18) lauryl ether | AEO7-24S | Sasol (China) Chemical Co., Ltd. |
| Cationic | Di-oleic acid triethanolamine esterquat | PRAEPAGEN 4317 | Clariant Chemicals (China) Ltd. |
| Cationic | Di-tallow dimethyl ammonium chloride | PRAEPAGEN 3345 | Clariant Chemicals (China) Ltd. |

| Surfactant Type and Class | Surfactant Name | Product Name | Source |
|---|---|---|---|
| Cationic | Alkyl (50% C14, 40% C12, 10% C16) dimethyl benzyl ammonium chloride (32%) Didecyl dimethyl ammonium chloride (14.4%) dioctyl dimethyl ammonium chloride (9.6%) Octyl decyl dimethyl ammonium chloride (24%) | BARDAC 208M | Lonza |
| Cationic Surfactant Type and Class | Alkyldimethyl-benzylammonium chloride | DODIGEN 226 | Clariant Chemicals (China) Ltd. |
| Anionic Sulfosuccinate | Dioctyl ester of sodium sulfosuccinic acid | AEROSOL OT | Cytec Industries |
| Anionic Sulfosuccinates | A(C13) sulfosuccinates | AEROSOL TR | Cytec Industries |
| Anionic Alkylbenzene sulfonates and sulfates | Sodium branched alkyl (C12) benzene sulfonate | POLYSTEP A-16 | Stepan Company |
| Anionic Alkylbenzene sulfonates and sulfates | Sodium dodecyl benzene sulfonate | RHODOCAL DS-10 | Rhone-Poulenc |
| Anionic Polyethoxylated derivatives of straight or branched chain aliphatic sulfate | Polyethoxylated alkyl (C12) ether sulfate, ammonium salt | STEOL CA-460 | Stepan Company |
| Anionic Straight or branched chain aliphatic sulfates and sulfonates | Aliphatic sulfates | HOSTASTAT HS-1 | Hoechst Celanese Corp. |
| Anionic Alkylbenzene sulfonates and sulfates | Sodium linear alkyl (C12) benzene sulfonate | POLYSTEP A-15 | Stepan Company |
| Anionic Alkyl carboxylate | Sodium stearate | | Witco |
| Amphoteric Alkyl carboxylates | N-coco-aminopropionic acid | MIRATAINE AP-C | Rhone-Poulenc |
| Anionic Alkyl phosphate mono- or di- ester | Ethoxylated dodecyl alcohol phosphate ester, sodium salt | RRODAFAC MC-470 | Rhone-Poulenc |
| Nonionic Polyethoxylated alkyl alcohol | Polyoxyethylene (23) lauryl ether | BRIJ 35 | ICI Americas Inc. |
| Nonionic Polyethoxylated alkyl alcohol | Plyoxyethylene (4) lauryl ether | BRIJ 30 | ICI Americas Inc. |
| Nonionic Polyethoxylated alkyl alcohol | Polyoxyethylene (7) lauryl ether | AEO7-24S | Sasol (China) Chemical Co., Ltd. |
| Nonionic Polyethoxylated alkyl alcohol | Polyoxyethylene (9) lauryl ether | AEO9-24S | Sasol (China) Chemical Co., Ltd. |
| Nonionic Polyethoxylated alkyl alcohol | Polyoxyethylene (18) lauryl ether | AEO18-24S | Sasol (China) Chemical Co., Ltd. |
| Nonionic Block copolymers of polyethylene oxide and polypropylene oxide | Block copolymers of ethylene oxide and propylene oxide | TETRONIC 1502 | BASF Corp. |
| Nonionic Block copolymers of polyethylene oxide and polypropylene oxide | PEG-PPG-PEG block copolymer | PLURONIC F38 | BASF Corp. |
| Nonionic Block copolymers of polyethylene oxide and polypropylene oxide | PEG-PPG-PEG block copolymer | TETRONIC 908 | BASF Corp. |
| Nonionic Amine oxide | Lauryl dimethylamine oxide | RHODAMOX LO | Rhone-Poulenc |
| Nonionic Polyethoxylated alkyl alcohol | Ethoxylated trimethylnonanol | TERGITOL TMN-6 | Union Carbide Chemical & Plastics Co., |

Preferred surfactants are organosilicone surfactants (e.g., polyether modified dimethylpolysiloxane), lauryl dimethylamine oxide, and fluorochemical surfactants. For products that include a silicone surface (e.g., silicone substrate or silicone coating such as a silicone hardcoat), more preferred surfactants are organosilicone surfactants.

If used, the surfactant concentration in coating compositions of the present invention is preferably at least 0.1 percent by weight (wt-%) of the coating composition, more preferably at least 0.4 wt-%, and even more preferably at least to 1 wt-%. If used, the surfactant concentration is preferably no greater than 5 wt-% of the coating composition, more preferably no greater than 2 wt-% of the coating composition.

Another optional but preferred additive is an antimicrobial agent. Examples include the following (with information with respect to compatibility with water and epoxy groups):

| Product Name | Composition | Company | Soluble in Water | Compatibility with Epoxy-particle/BYK-333/Q2-5211 |
|---|---|---|---|---|
| Kathon CG | 5-Chloro-2-methyl-4-isothiazolin-3-one 2-Methyl-4-isothiazolin-3-one Magnesium chloride Magnesium nitrate Water | Rohm & Haas | Good | GOOD; good wetting on PC mask, PET and PC film. |
| C302 | 1,3-Dimethylol-5,5-dimethylhydantoin | Shanghai JiuXin Chem. Co. Ltd. | Good | Good; good wetting on PC mask, PET and PC film |
| Protectol PE/PES | 2-Phenoxyethanol | BASF | Dissolves in hot water | Good; good wetting on PC mask, PET and PC film |
| Methyl-saraben | Methyl-p-hydrobenzoate | Taizhou Necchem Company (China) | Dissolves in hot water | Good; good wetting on PC mask, PET and PC film |

-continued

| Product Name | Composition | Company | Soluble in Water | Compatibility with Epoxy-particle/BYK-333/Q2-5211 |
|---|---|---|---|---|
| Propyl-saraben | Propyl-p-hydrobenzoate | Taizhou Necchem Company (China) | Does not dissolve in hot water | Not Applicable |
| Dodigen 226 | Alkyldimethyl-benzylammonium chloride | Clariant Chemicals (China) Ltd. | Good | Good; good wetting on PC mask, PET and PC film |
| Nipacide BIT20 | Benzisothia-zolinone | Clariant Chemicals (China) Ltd. | Good | Good; good wetting on PC mask, PET and PC film |

If used, the antimicrobial concentration in coating compositions of the present invention is preferably at least 0.0005 percent by weight (wt-%) of the total weight of the coating composition, more preferably at least 0.001 wt-%, and even more preferably at least 0.002 wt-%. If used, the antimicrobial concentration is preferably no greater than 1 wt-%, and more preferably no greater than 0.1 wt-% of the total weight of the coating composition.

Typically, the coating compositions of the present invention include water as the liquid carrier (i.e., fluid media); however, organic solvents can be used in addition to the water. Suitable organic solvents in the present invention include methanol, ethanol, isopropanol, butanol, propylene glycol and its monomethyl ether, ethylene glycol and its monomethyl ether, ketones such as acetone and methyl ethyl ketone, and ethers such as tetrahydrofuran (THF), N,N-dimethylacetamide, formamide, or combinations thereof. The amount of organic solvent in the coating composition is typically no more than 30 wt-% of the total weight of an antifogging coating composition. The preferred fluid medium is aqueous, e.g., water and optionally one or more alcohols.

Articles

Substrates to which the coating compositions of the invention can be applied are preferably transparent or translucent to visible light. They include both organic and inorganic materials. Exemplary substrates are made of polyester (e.g., polyethylene terephthalate (PET), polybutylene-terephthalate), polycarbonate (PC), allyldiglycolcarbonate, polyacrylates such as polymethylmethacrylate, polystyrene, polysulfone, polyethersulfone, cellulose acetate butyrate, glass, and the like, including blends and laminates thereof. Typically the substrate is in the form of a film, sheet, panel or pane of material and is part of an article such as protective eye wear, face masks, face shields, surgical masks, and various other types of personal protection equipment, particularly for eyes, as well as mirrors, motor vehicle windows and windshields. The coatings may if desired, cover only a portion of the article, e.g., only the section immediately adjacent the eyes in a face shield may be coated. The substrate may be flat, curved or shaped. The article to be coated may be produced by blowing, casting, extrusion, or injection molding.

The compositions of the present invention can be coated on a substrate by simply wiping a pad, cloth, paper towel, or other application device/material over the surface of the substrate, wherein the composition is contained within the pad, cloth, etc. or applied to the surface of the substrate surface. Alternatively, the compositions of the present invention can be coated on a substrate using other conventional techniques, such as bar, roll, curtain, rotogravure, spray, or dip coating techniques.

The coatings of the present invention are preferably coated on both sides of the substrate. Alternatively, the coatings of the present invention may be coated on one side of the substrate. The opposite side of the substrate may be uncoated or coated with a wide variety of conventional antifogging compositions. Preferably, the coating surface should face the direction of higher humidity, e.g., on a face shield the side having the antifog coating should face the wearer.

For coating compositions of the present invention, no specific drying conditions are required. A coated surface may be dried at room temperature over a 15 minute period and if desired, at elevated temperatures, to dry more quickly, such as within 5 minutes.

Figure 2:
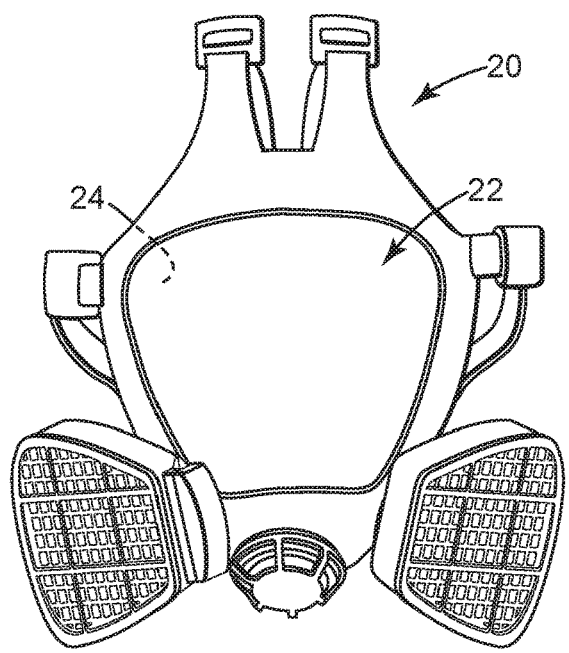
FIG. 2 illustrates an alternative embodiment of a respirator comprising a face shield having a transparent substrate with an antifog coating thereon.
Figure 3:
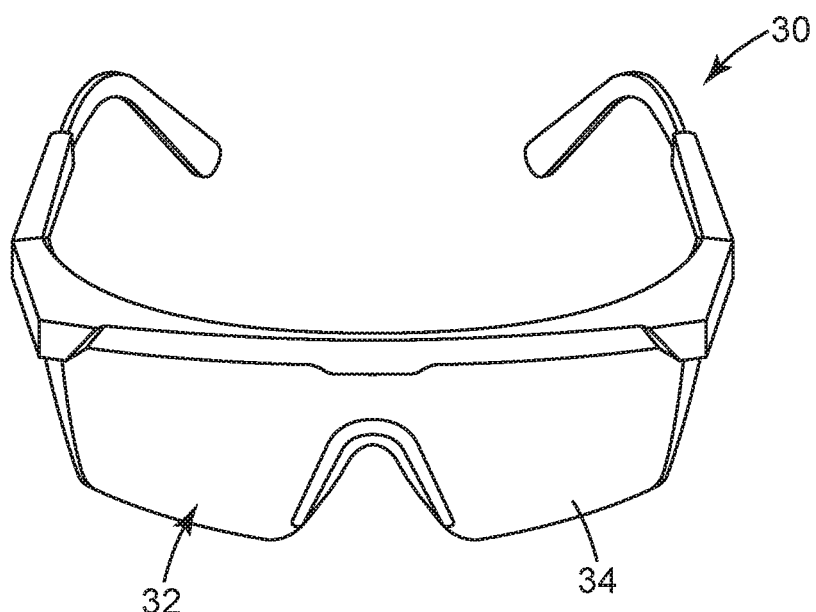
FIG. 3 illustrates eye glasses having a transparent substrate with an antifog coating on the outside surface of the transparent substrate.

Examples of face shields and eyewear incorporating the coating compositions of the present invention are shown in FIGS. 1-3. FIG. 1 illustrates a respirator 10 including a transparent substrate 12 as a face shield, which is used to protect the eyes and face of the wearer. The coating composition of the present invention can be applied to one side of the face shield, or to both the inside 14 and outside 16 of the transparent substrate 12. FIG. 2 illustrates an alternative embodiment of a respirator 20 having a transparent substrate 22 as a face shield with an antifog coating on the inside surface 24 of the transparent substrate 22. FIG. 3 illustrates eye glasses 30 having a transparent substrate 32 with an antifog coating on the outside surface 34 of the transparent substrate 32. In should be appreciated that the antifog coating of the present invention can be used on any conventional face shield, mask, visor, or the like, wherein antifogging characteristics are desired.

Coating compositions of the present invention can be supplied in liquid form (e.g., in a pourable form or sprayable form) or impregnated into an applicator substrate (e.g., forming an applicator pad or wipe). Suitable applicator substrates can be in the form of a sponge, foam, woven, nonwoven, or knit material, for example. The term "nonwoven web" or "nonwoven fabric" refers to a web or fabric having a structure of individual fibers that are interlaid in an irregular manner. In contrast, knit or woven fabrics have fibers that are interlaid in a regular manner. Materials of the applicator substrate (e.g., applicator pad or wipe) can include synthetic or natural fibers, filaments, or yarns. Suitable materials include, but are not limited to, polyolefins, polyesters, polyamides (e.g., nylons), polyurethanes, halogenated polyolefins, polyacrylates, polyureas, polyacrylonitriles, cellulose, cotton, rayon, jute, hemp, as well as copolymers and polymer blends thereof. Various combinations of materials in various shapes can be used for applicator substrates if desired. The most typical substrate is a paper wipe containing the coating composition (soaked or impregnated into the wipe).

EXAMPLES

Unless otherwise indicated, all chemical reagents and solvents were or can be obtained from Aldrich Chemical Co., Milwaukee, Wis. All parts, percentages, or ratios specified in the examples are by weight, unless specified otherwise.

Silica nanoparticles dispersions 1034a (20-nm), 2327 (20-nm), 1050 (20-nm), 1115 (4-nm) and 2326 (5-nm) were obtained from Nalco Company, Naperville, Ill.

3-(Glycidoxypropyl)-trimethoxysilane, (GPS, 97%) was obtained from Gelest Inc., Morrisville, Pa. or from Zhejiang Chem-Tech Group Co., Ltd. Hangzhou, Zhejiang Province, China. Aqueous organosilanol-sulfonic acids were prepared following the procedures described in U.S. Pat. No. 4,338,377 (Example No. 1). Alternatively, organosilanol sulfonic acids can be obtained from Gelest Inc. Carboxyl-silane (carboxyethylsilanetriol sodium salt, 25% in water) and PEG-silane (2-[methoxy(polyethyleneoxy) propyl] trimethoxysilane) were obtained from Gelest Inc., Morrisville, Pa.

FC-4430 was obtained from 3M Company of St. Paul, Minn. BYK-333 was obtained from BYK Chemie, Wesel, Germany. Q2-5211 was obtained from Dow Corning Company, Midland, Mich.

LVBAO brand SO3H-type 7320 ion exchange resin was obtained from Shanghai Synthetic Resin Inc., Shanghai, China.

PRAEPAGEN 4317, PRAEPAGEN 3345 and DODIGEN 226 are available from Clariant Chemicals (China) Ltd, Qingdao, China and BARDAC 208M can be obtained from Lonza, Inc., Allendale, N.J.

Antifogging Performance Test Method

Antifogging performance was evaluated by exposing a coated sample surface to water vapor under various conditions. Surfaces of test specimens such as PC masks (3M Full Face piece 6800, or 7800), and PET face shields (3M Hoods H-600 series, or H-400), available from 3M Company, St. Paul, Minn.), or PC film (available under the tradenames LEXAN 8010 (0.381-mm), 8010SHC (1.0-mm) and OQ92 from GE Advanced Materials Specialty Film and Sheet, Pittsfield, Mass.) were coated by applying 2-3 drops of coating solution on the desired surface, and then rubbing it lightly with a paper towel using light pressure until a thin clear uniform layer was formed, or by using a nonwoven padding to apply the coating solution followed by a wiping of the coated surface to form a thin clear layer.

Testing of the coated surface of the sample was conducted by exposing the previously coated surface to water vapor. The coated surface, kept at room temperature (T2) was exposed to water vapor residing above a container of water kept at temperature T1 (T2+15 to 20° C.). Coatings were considered antifogging if a coated sample surface did not accumulate small, condensed water droplets in sufficient quantity to significantly reduce the transparency of the sample such that it cannot be clearly seen through, immediately after holding the sample above the water container. A coating composition may still be regarded as antifogging even though a uniform water film or a very small number of large water droplets forms on the coated substrate so long as the transparency of the coated sample is not significantly reduced such that it cannot be readily seen through.

When appropriate, the applied and dried coating was easily removed by rinsing the coated surface with water or by wiping off the coating with a wet paper towel. Subsequently the cleaned surface area was air dried. The surface area of the sample, once the coating was removed, became hydrophobic and fogged just like the untreated surface.

Surface Modified Nanoparticle (SMN) Sample 1:

Nalco 1050 silica nanoparticles (48 g, 50%) and deionized water (150 grams (g)) were stirred together in a glass jar for 15 minutes (min). The pH of this mixture was adjusted to be within a range of 5 to 6 using a type 7320 ion exchange resin to facilitate ring opening of the epoxy groups and hydroxyl group formation. The ion exchange resin was removed by filtration and the solid content of the dispersion solution was measured by evaporating off water at 120° C. for 30 min. GPS (4.63 g) was added dropwise with stirring over a period of 1 to 1.5 hours (hrs) and the resulting mixture was continuously stirred for an additional 72 hrs at room temperature. Typically, the longer the reaction time, the greater the amount of epoxy functionalization and hydroxyl group formation. All organic volatiles were then removed from the reaction mixture to obtain a solution, which was used in the preparation of antifogging coating samples.

SMN Sample 2:

Nalco 1050 silica nanoparticles (10 g, 50%) was diluted with deionized water (90 g). The solution was stirred for 15 min and the pH of the solution was adjusted to be within a range of 1 to 2 with concentrated nitric acid. Subsequently GPS (0.18 g) was added dropwise with stirring (4 min), and the resulting mixture was continuously stirred for an additional 60 hrs at room temperature. All organic volatiles were then removed from the reaction mixture to obtain a solution which was used in the preparation of antifogging coating samples.

SMN Sample 3:

Sample 3 was prepared following the same procedure as described for SMN sample 2, but using Nalco 1050 silica nanoparticles (10 g, 50%), deionized water (90 g) and GPS (0.72 g).

SMN Sample 4:

Nalco 2326 silica nanoparticles (167 g, 15%) and deionized water (333 g) were stirred together in a glass jar for 15 min. The pH of this mixture was adjusted to be about 1.4 to 1.5 using concentrated nitric acid. GPS (21.2 g, 150 equivalents) was added dropwise with stirring over a period of 1 hr to 1.5 hrs and the resulting mixture was continuously stirred for an additional 30 minutes at room temperature followed by placement in an oven at 80° C. for 16 hrs. All organic volatiles were then removed from the reaction mixture to obtain a solution which was used in the preparation of antifogging coating samples.

SMN Sample 5:

Nalco 1034a silica nanoparticles (71 g, 34%) and deionized water (209 g) were stirred together in a glass jar for 15 min. GPS (5.30 g)—was added dropwise with stirring over a period of 1 to 1.5 hrs, and the resulting mixture was continuously stirred for an additional 72 hrs at room temperature. No pH adjustment was required as the dispersion was already acidic. All organic volatiles were then removed from the reaction mixture to obtain a solution, which was used in the preparation of antifogging coating samples.

SMN Sample 6:

Nalco 1050 silica nanoparticles (2 g, 50%) and deionized water (17.6 g) were stirred together in a glass jar for 15 min. A carboxy-silane having the formula $C_3H_6Na_2O_5Si$ (0.12 g, 25%) was added dropwise over a 3-min period and then it was kept in an oven for 1 hr at 90° C. The pH of this mixture was adjusted to be about 1.8 using concentrated nitric acid. GPS (0.11 g) was added dropwise with stirring over a 3-min period and the resulting mixture was continuously stirred for additional 21 hrs at room temperature. The solution was used in the preparation of antifogging coating samples.

SMN Sample 7:

This sample was prepared following the same procedure as described for SMN sample 6, but using Nalco 2326 silica nanoparticles (6.7 g, 15%), deionized water (12.4 g) the carboxy-silane having the formula $C_3H_6Na_2O_5Si$ (0.48 g, 25%) and GPS (0.42 g).

SMN Sample 8:

To a portion of SMN Sample 4 (4%) in water, was added surfactants sodium dodecyl benzene sulfonate or lauryl dimethylamine oxide (as specified in Table 1) and mixed thoroughly before use.

SMN Sample 9:

GPS (5 g) was hydrolyzed by adding dropwise with stirring over a period of 1-1.5 hrs, to water (95 g) at pH of 1.5 (adjusted using concentrated nitric acid). The resulting mixture was continuously stirred for an additional 30 mins at room temperature and then for 6 hrs at 60° C. To this mixture containing hydrolyzed GPS (5 wt-% in water at pH 1.5) was added Q2-5211 (0.4% of total mixture) and BYK-333 (0.4% of total mixture) after thorough mixing for 15 mins.

SMN Sample 10:

Nalco 2326 silica nanoparticles (167 g, 15% was diluted with deionized water (333 g). The solution was stirred for 15 mins and the pH of the solution was adjusted to be within a range of 1 to 2 with concentrated nitric acid. Subsequently GPS (3.55 g, 25 equivalents) was added dropwise with stirring (4 mins), and the resulting mixture was continuously stirred for an additional 60 hrs at room temperature. All organic volatiles were then removed from the reaction mixture to obtain a solution which was used in the preparation of antifogging coating samples.

Examples 1 to 27

To a portion of SMN samples as listed in Table 1, NaOH (1N) was added to adjust the pH of the solutions to 6-8. For certain examples, a surfactant or a mixture of surfactants as listed in Table 1 was added along with an antimicrobial agent (10 ppm, Kathon CG, from Rohm and Haas Company, Philadelphia, Pa.) to each mixture and the resulting mixtures were stirred for 30 mins to obtain solutions which were then evaluated following the Antifogging Performance Test Method. Coating solution shelf-life of selected samples was evaluated by storing them at 85° C. Some of the components in coating solution of Example 4 precipitated out in about 4 days while coating solution of Example 5 remained clear with no noticeable precipitation even after 8 days when stored under similar conditions.

Comparative Examples 1-3

Samples used for these evaluations were prepared using the procedure described for Examples 1-16, except that SMN samples were not included in the mixture.

TABLE 1

Antifogging Coatings

| Example No. | SMN Sample No. | Surfactant (wt-%) | Coating solution stability | Coated surface appearance | Test Sample | Results of Antifogging Performance Test |
|---|---|---|---|---|---|---|
| 1 | 1 | FC-4430 (0.5) | Clear | Good | PC mask 6800/7800 | 56 hrs |
| 2 | 2 | BYK-333 (0.5) Q2-5211 (0.5) | Clear | Good | PC mask 6800/7800 | 26.5 hrs |
| 3 | 3 | BYK-333 (0.5) Q2-5211 (0.5) | Clear | Good | PC mask 6800/7800 | 15.5 hrs |
| 4 | 10 | BYK-333 (0.5) Q2-5211 (0.5) | Clear | Good | PC mask 6800/7800 | 32.5 hrs |
| 5 | 4 | BYK-333 (0.5) Q2-5211 (0.5) | Clear | Good | PC mask 6800/7800 | 16-17 hrs |
| 6 | 5 | FC-4430 (0.5) | Clear | Good | PC mask 6800/7800 | 56 hrs |
| 7 | 5 | BYK-333 (3.3) | Clear | Good | PC mask 6800/7800 | 13.5 hrs |
| 8 | 5 | BYK-333 (3.3) | Clear | Good | glass sheet | >40 hrs |
| 9 | 5 | Q2-5211 (1.2) | Clear | Good | PC mask 6800/7800 | 27 hrs |
| 10 | 6 | BYK-333 (1.0) Q2-5211 (1.0) | Clear | Good | PC mask 6800/7800 | 5 hrs |
| 11 | 7 | BYK-333 (1.0) Q2-5211 (1.0) | Clear | Good | PC mask 6800/7800 | 18.5 hrs |
| 12 | 2 | None | Clear | Good | PET | 26.5+ hrs |
| 13 | 3 | None | Clear | Good | PET | 29.5+ hrs |
| 14 | 1 | None | Clear | Good | PET | 34+ hrs |
| 15 | 8 | Sodium dodecyl benzene sulfonate (0.8%) | Clear | Poor | PC mask 6800/7800 | Not Done (N/D) |
| 16 | 8 | Sodium dodecyl benzene sulfonate (0.8%) | Clear | Good | PET | 5.5 hrs |
| 17 | 8 | Lauryl dimethylamine oxide (0.8%) | Hazy | Poor | PC mask 6800/7800 | N/D |
| 18 | 8 | Lauryl dimethylamine oxide (0.8%) | Hazy | Good | PET | 13-20.5 hrs |
| 19 | 9 | BYK-333 (0.4) Q2-5211 (0.4) | Clear | Good | PC film | 6 hrs |
| 20 | 10 | None | Clear | Good | PC film | 23+ hrs |
| 21 | 2 | None | Clear | Good | PC film | 23+ hrs |

TABLE 1-continued

Antifogging Coatings

| Example No. | SMN Sample No. | Surfactant (wt-%) | Coating solution stability | Coated surface appearance | Test Sample | Results of Antifogging Performance Test |
|---|---|---|---|---|---|---|
| 22 | 4 | BARDAC 208M (2%) | Clear | Good | PC mask | N/D |
| 23 | 4 | PRAEPAGEN 4317 (1%) | Hazy | Good | PET | N/D |
| 24 | 4 | PRAEPAGEN 3345 (1%) | Hazy | Good | PET | N/D |
| 25 | 4 | PRAEPAGEN 4317 (2%) | Hazy | Poor | PC mask | N/D |
| 26 | 4 | PRAEPAGEN 3345 (2%) | Hazy | Poor | PC mask | N/D |
| 27 | 4 | DODIGEN 226 (2%) | Clear | Good | PC mask | N/D |
| Comp. Example 1 | | 1% FC-4430 | Clear | Good | PC film | 3-4 hrs |
| Comp. Example 2 | | 10% BYK-333 | Clear | Good | PC film | 6 hrs |
| Comp. Example 3 | | 1.5% Q2-5211 | Clear | Good | PC film | 2.5 hrs |

Example 28

A 20 wt-% aqueous dispersion of $ZrO_2$ nanoparticles, 5-10 nm, available from the PQ Corporation, (10 g), is diluted with deionized water (30 g). The solution is stirred for 15 min and the pH of the solution is adjusted to be within a range of 1 to 2 with concentrated nitric acid. Subsequently GPS (0.35 g) is added dropwise with stirring (4 min), and the resulting mixture is continuously stirred for an additional 60 hrs at room temperature. All organic volatiles are then removed from the reaction mixture to obtain a solution/dispersion which is used in the preparation of antifogging coating samples.

Example 29

A 20 wt-% aqueous dispersion of Aluminum Hydroxide Oxide nanoparticles available from the PQ Corporation, product code: AL-20, AL-20DW (10 g), is diluted with deionized water (30 g). The solution is stirred for 15 min and the pH of the solution is adjusted to be within a range of 1 to 2 with concentrated nitric acid. Subsequently, GPS (0.40 g) is added dropwise with stirring (4 min), and the resulting mixture is continuously stirred for an additional 60 hrs at room temperature. All organic volatiles are then removed from the reaction mixture to obtain a solution/dispersion which is used in the preparation of antifogging coating samples.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of providing antifogging characteristics to a substrate, the method comprising:

a) obtaining an antifogging coating composition, the coating composition comprising
nanoparticles comprising a silica surface having functional groups attached to the surface through covalent bonds, wherein the functional groups comprise:
epoxy groups; and
optional water-dispersible groups;
optional surfactants;
optional antimicrobial agents;
optional organic solvents, wherein the optional organic solvents are present in an amount of no more than 30 wt-% of the total weight of the coating composition; and
water as a liquid carrier of the coating composition; and b) applying the coating composition to a substrate and allowing it to dry, wherein the coating composition provides antifogging characteristics to the substrate on which it is coated and dried, and is removable after drying.

2. The method of claim 1, wherein the obtaining the coating composition comprises preparing the coating composition by reacting one or more epoxy functional compounds with nanoparticles having an average particle size of no greater than 60 nm, wherein the reacting occurs in a mixture comprising water as a liquid carrier and having a pH of no greater than 6 for at least three hours.

3. The method of claim 2, further comprising adjusting the pH of the mixture to be no greater than 6 prior to reacting the one or more epoxy functional compounds with the nanoparticles.

4. The method of claim 2, wherein the reacting occurs in a mixture comprising water as a liquid carrier and having a pH of no greater than 6 for at least twelve hours.

5. The method of claim 4, further comprising removing organic volatiles following reacting the one or more epoxy functional compounds with the nanoparticles.

6. The method of claim 2, further comprising covalently attaching water-dispersible groups to the nanoparticles.

7. The method of claim 2, wherein the mixture has a pH of 1 to 3 for at least three hours.

8. The method of claim 1, wherein the nanoparticles are present in the antifogging coating composition in a concentration of no greater than 10 weight percent, based on the total weight of the coating composition.

9. The method of claim 2, further comprising adding a surfactant following reacting the one or more epoxy functional compounds with the nanoparticles.

10. The method of claim 1, wherein the coating composition comprises no more than 30 weight percent organic solvent, based on the total weight of the coating composition.

11. The method of claim 2, further comprising adding an antimicrobial agent following reacting the one or more epoxy functional compounds with the nanoparticles.

12. The method of claim 1, further comprising impregnating the coating composition into an applicator substrate prior to applying the coating composition to the substrate.

13. The method of claim 2, further comprising adjusting the pH of the mixture to be between 6 and 8 following reacting the one or more epoxy functional compounds with the nanoparticles.

14. The method of claim 1, further comprising wiping off the dried coating with a paper towel.

15. The method of claim 14, wherein after wiping off the dried coating no residue of the dried coating remains on the substrate.

16. The method of claim 14, further comprising applying the coating composition to the substrate and allowing it to dry, thereby providing a fresh layer of coating.

17. The method of claim 1, wherein the coating composition is applied to the substrate using a paper wipe impregnated with the coating composition.

18. The method of claim 1, wherein the coating composition is allowed to dry under ambient conditions.

19. The method of claim 1, further comprising removing the dried coating; applying the coating composition to the substrate; and allowing it to dry, thereby providing a fresh layer of coating.

20. A method of making an antifogging coating composition, the method comprising reacting one or more epoxy functional compounds with nanoparticles having an average particle size of no greater than 60 nm, wherein the reacting occurs in a mixture comprising water as a liquid carrier and having a pH of no greater than 6 for at least three hours; and storing at least a portion of the coating composition in a sealed container for at least eight days and up to two years.

21. The method of claim 20, further comprising impregnating the coating composition into an applicator substrate prior to storing the coating composition in the sealed container.

* * * * *